(12) United States Patent
Khan et al.

(10) Patent No.: US 8,200,051 B2
(45) Date of Patent: Jun. 12, 2012

(54) APPARATUS USING WAVEGUIDE, OPTICAL TOUCH PANEL, AND METHOD OF FABRICATING WAVEGUIDE

(75) Inventors: Sazzadur Rahman Khan, Ibaraki (JP); Noriyuki Juni, Ibaraki (JP); Visit Thaveeprungsriporn, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 1115 days.

(21) Appl. No.: 12/054,037

(22) Filed: Mar. 24, 2008

(65) Prior Publication Data

US 2009/0237375 A1 Sep. 24, 2009

(51) Int. Cl.
*G02B 6/12* (2006.01)
*G02B 6/42* (2006.01)
*G02B 6/10* (2006.01)
*G06F 3/042* (2006.01)

(52) U.S. Cl. ............. 385/14; 385/47; 385/129; 345/175
(58) Field of Classification Search .................. 345/175; 385/47
See application file for complete search history.

(56) References Cited

U.S. PATENT DOCUMENTS

| | | | |
|---|---|---|---|
| 4,737,626 A * | 4/1988 | Hasegawa | 250/221 |
| 5,914,709 A | 6/1999 | Graham et al. | |
| 6,181,842 B1 | 1/2001 | Francis et al. | |
| 6,351,260 B1 | 2/2002 | Graham et al. | |
| 6,597,508 B2 | 7/2003 | Seino et al. | |
| 6,818,721 B2 | 11/2004 | Zha et al. | |
| 6,965,006 B2 | 11/2005 | Zha | |
| 7,099,553 B1 | 8/2006 | Graham et al. | |
| 2004/0201579 A1 | 10/2004 | Graham | |
| 2005/0089298 A1 | 4/2005 | Maxwell et al. | |
| 2005/0201681 A1 | 9/2005 | Payne | |
| 2005/0271319 A1 | 12/2005 | Graham | |
| 2005/0271326 A1 | 12/2005 | Luo | |
| 2005/0271983 A1 | 12/2005 | Payne | |
| 2006/0001653 A1 | 1/2006 | Smits | |
| 2006/0001654 A1 | 1/2006 | Smits | |
| 2006/0002655 A1 | 1/2006 | Smits | |
| 2006/0088244 A1 | 4/2006 | Kukulj et al. | |
| 2006/0188196 A1 | 8/2006 | Charters et al. | |
| 2006/0188198 A1 | 8/2006 | Charters et al. | |
| 2007/0154133 A1 | 7/2007 | Graham | |
| 2008/0106527 A1 * | 5/2008 | Cornish et al. | 345/176 |
| 2008/0278460 A1 * | 11/2008 | Arnett et al. | 345/175 |

FOREIGN PATENT DOCUMENTS

JP 2007-070320 A 3/2007
WO 2007/048180 A1 5/2007

* cited by examiner

*Primary Examiner* — Michelle R Connelly Cushwa
(74) *Attorney, Agent, or Firm* — Sughrue Mion, PLLC

(57) ABSTRACT

An apparatus, an optical touch panel, a waveguide, and a process for producing a double layered waveguide structure are provided. The apparatus includes a waveguide having a plurality of transmission waveguide elements and a plurality of reception waveguide elements; a light source coupled to the waveguide; a light detector coupled to the waveguide; and a reflector, spaced apart from the waveguide, the reflector reflecting light emitted from the plurality of transmission waveguide elements towards the reception waveguide elements. The waveguide includes a substrate, a first cladding layer, a reception waveguide, a second cladding layer, a transmission waveguide, and a third cladding layer. The optical touch panel includes a waveguide section comprising a waveguide; a mirror; a surface emitting laser; and a detector.

21 Claims, 10 Drawing Sheets

APPARATUS USING WAVEGUIDE, OPTICAL TOUCH PANEL, AND METHOD OF FABRICATING WAVEGUIDE

BACKGROUND OF THE INVENTION

1. Field of the Invention

Apparatuses, devices, and methods consistent with the present invention relate to apparatuses using waveguides, and, more specifically, to optical touch panels using waveguides.

2. Description of the Related Art

Recently, there has been growing interest among researchers and consumers in alternative input methods for industrial electronic monitors, televisions (TVs), computers, cellular phones, personal data assistants (PDAs), automated teller machines (ATMs), and many other electronic devices. Input methods such as keyboard, keypad, and mouse become less viable as electronic devices become smaller because of the relatively large amount of space required to implement a keyboard or to manipulate a mouse. Moreover, the keyboard, keypad, and mouse are mechanical devices that tend to break down when placed in harsh industrial environments.

As an alternative to the above-described input methods, touch screens and touch panels based on resistive and capacitive technologies have been proposed. However, touch panels based on resistive and capacitive technologies have disadvantages in that resistive and capacitive touch panels require thin coatings of transparent conducting oxide (TCO) which are easily mechanically damaged, interfere with the color purity of the screen, and decrease the brightness of the screen. Moreover, the sensors used in the resistive and capacitive touch panels are heavy and also prone to mechanical breakage.

Touch screens and touch panels based on glass substrates have also been proposed. However, glass substrate touch screens require a specially fitted frame for mounting sensors over a monitor or display. This frame adds weight, cost, and complexity to the touch screen. Moreover, glass substrate based touch screens must be manufactured from individual substrates of cut glass. Working with large sheets of cut glass requires considerable care and skill so as not to break the glass and thus decrease yields. Thus, the manufacturing process is both costly and time consuming.

Optical type touch panels and touch screens address some of the disadvantages noted above with the resistive and capacitive touch panels and the glass substrate based touch panels. Thus, there is an increasing demand for optical type touch screens for use in a wide range of applications. To this end, two types of optical touch panels have been proposed, one based on light emitting elements and the other based on waveguides.

For example, U.S. Pat. No. 6,597,508 describes a related art optical touch panel which uses light emitting elements. Light emitting elements and light receiving elements are arranged in an alternating pattern on two perpendicular sides of a position detecting surface. The light receiving elements are provided with hollow cylinders. Mirrors are provided on the other sides of the panel. Light is emitted from one of the light emitting elements, reflected by the mirror, and is then received by the two light receiving elements to either side of the light emitting element. The hollow cylinders provided with the light receiving elements block out light reflected off of an object in a detection field of the panel or light from other light emitting elements which are not located on either side of the light receiving element.

However, the related art panel of U.S. Pat. No. 6,597,508 has a number of disadvantages. First, this panel requires a large number of light emitting elements and light receiving elements. This increases the cost. Second, because the light emitting elements must be alternated with the light receiving elements in order to ensure adequate sensitivity, and thus detectability of an object, the panel resolution is very low. Additionally, the light emitting element and light receiving elements are prone to mechanical damage. Each damaged light emitting element or light receiving element reduces the sensitivity of the touch panel even further.

As another example, U.S. Pat. No. 6,351,260 describes a related art optical touch panel using waveguides. Transmission waveguide sections are provided on perpendicular sides of a touch panel. Reception waveguide sections are provided on sides opposite to the transmission waveguides. A light transmitter is provided at one end of each transmission waveguide section and a processing receiver at one end of each reception waveguide section. Each waveguide section has layers of waveguides, the layers being mechanically aligned and placed together using a layer of polyester and optical cement. Light is transmitted from the light transmitter, through the transmission waveguide section, across the touch panel, into the reception waveguide section and to the processing receiver.

However, the related art panel described in U.S. Pat. No. 6,597,508, while an improvement over the related art touch panel using light emitting elements, also has a number of disadvantages. First, in the case of multiple waveguide sections, two light transmitters and two processing receivers are required. This results in increased cost and the use of increased physical area for two light transmitters and two processing receivers. Second, the use of separate transmit and receive waveguide sections requires careful alignment of the transmitting and receiving waveguide sections so that the waveguides of the transmitting and receiving waveguide sections correspond to each other. This process is costly. This process is also complicated in that it requires an initialization process in order to determine which waveguides are incorrectly aligned. The misaligned individual waveguides must then be disconnected, disabled, or otherwise discounted in order to decrease false positive readings. Lastly, this alignment problem creates additional problems for panels operating in harsh environments. In harsh environments, such as those in which industrial electronic monitors are used, the related art touch panel is prone to being jostled, dropped, and being subjected to other such mechanical stresses. These stresses may increase misalignment of the waveguides and thus decrease the sensitivity and accuracy of the related art optical touch panel.

SUMMARY OF THE PRESENT INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

According to an exemplary embodiment of the present invention, there is provided an apparatus comprising a waveguide comprising a plurality of transmission waveguide elements and a plurality of reception waveguide elements; a light source coupled to the waveguide; a light detector coupled to the waveguide; and a reflector, spaced apart from the waveguide, the reflector reflecting light emitted from the plurality of transmission waveguide elements towards the reception waveguide elements.

According to another exemplary embodiment of the present invention, there is provided an optical touch panel comprising a waveguide section comprising a substrate; a first cladding layer formed on the substrate; a reception waveguide, formed on the first cladding layer, the reception waveguide comprising a plurality of reception waveguide elements; a second cladding layer formed on the reception waveguide; a transmission waveguide, formed on the second cladding layer, the transmission waveguide comprising a plurality of transmission waveguide elements; and a third cladding layer, formed on the transmission waveguide, the third cladding layer comprising a reception lens portion and a transmission lens portion, the reception lens portion formed in a position corresponding to the reception waveguide and the transmission lens portion formed in a position corresponding to the position of the transmission waveguide; a mirror provided on an opposite side of a detection area from the waveguide section; a surface emitting laser optically coupled to the waveguide section; and a detector optically coupled to the waveguide section.

According to yet another exemplary embodiment of the present invention, there is provided an optical waveguide comprising a substrate; a first cladding layer formed on the substrate; a plurality of first waveguide elements formed on the first cladding layer; a second cladding layer formed on the plurality of first waveguide elements; a plurality of second waveguide elements formed on the second cladding layer; and a third cladding layer, formed on the plurality of second waveguide elements, the third cladding layer comprising a first lens portion and a second lens portion, the first lens portion formed in a position corresponding to the plurality of first waveguide elements, and the second lens portion formed in a position corresponding to the position of the second waveguide elements.

According to yet another exemplary embodiment of the present invention, there is provided a method of detecting an object in a detection area, the detection area having a waveguide on at least one side thereof and a reflector positioned across the detection area and opposite to the waveguide, the waveguide comprising a plurality of transmission waveguide elements and a plurality of reception waveguide elements, the method comprising coupling light into the plurality of transmission waveguide elements of the waveguide; simultaneously transmitting a plurality of light beams from the plurality of transmission waveguide elements across the detection area; receiving a plurality of light beams at a plurality of reception waveguide elements of the waveguide, a first portion of the plurality of received light beams having been reflected off of the reflector on the opposite side of the detection area, a second portion of the light beams being reflected off of the object in the detection area; detecting an intensity of each of the plurality of received light beams; and determining a position of the object within the detection area according to the detected intensity of the plurality of received light beams.

According to yet another exemplary embodiment of the present invention, there is provided a process for producing a double layered waveguide structure, the process comprising forming an undercladding layer on a substrate; forming a first patterned core layer on the undercladding layer; forming a first overcladding layer on the first patterned core layer; forming a separating cladding layer on the first overcladding layer; forming a second patterned core layer on the separating cladding layer; forming a second overcladding layer on the second patterned core layer to produce a waveguide structure; developing the waveguide structure; and removing the substrate from the waveguide structure to produce the double layered waveguide structure.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

Figure 1:
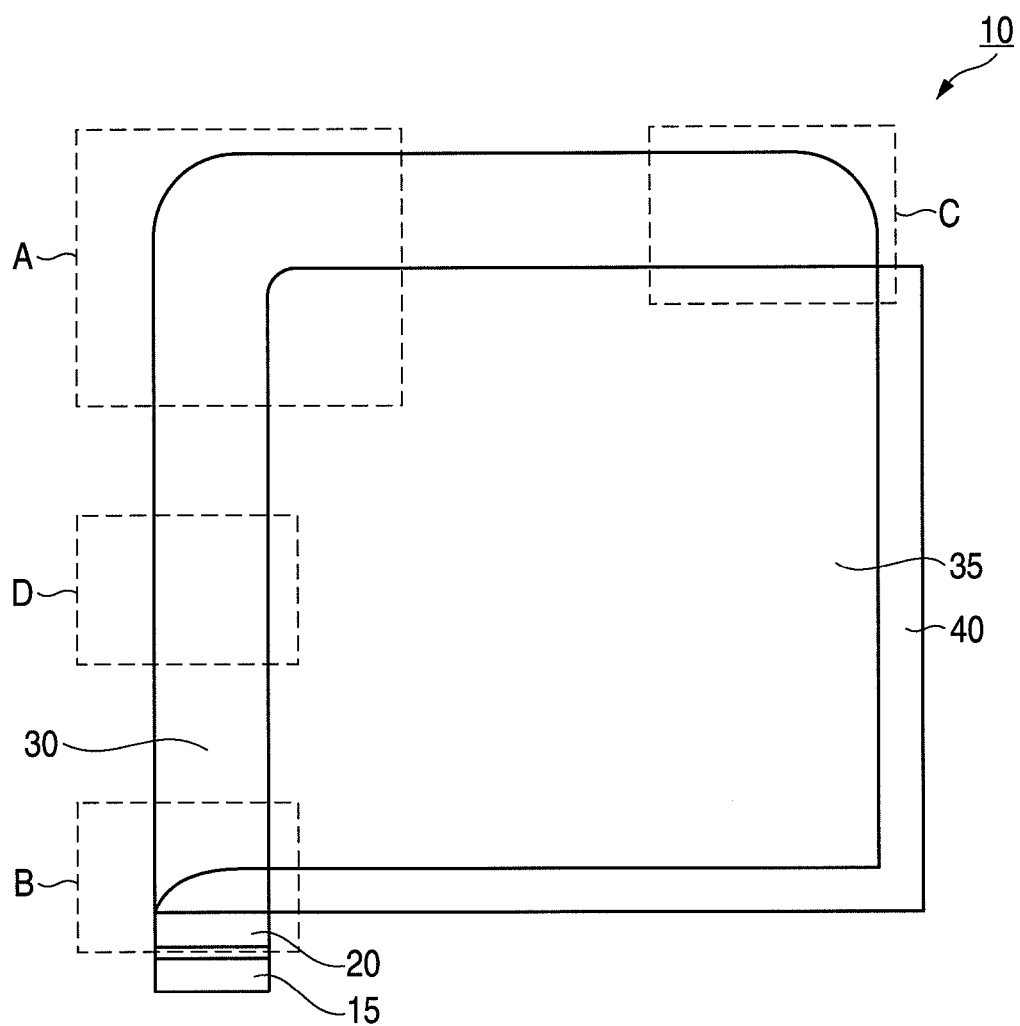
FIG. 1 shows top view of an apparatus according to an exemplary embodiment of the present invention.
Figure 2A:
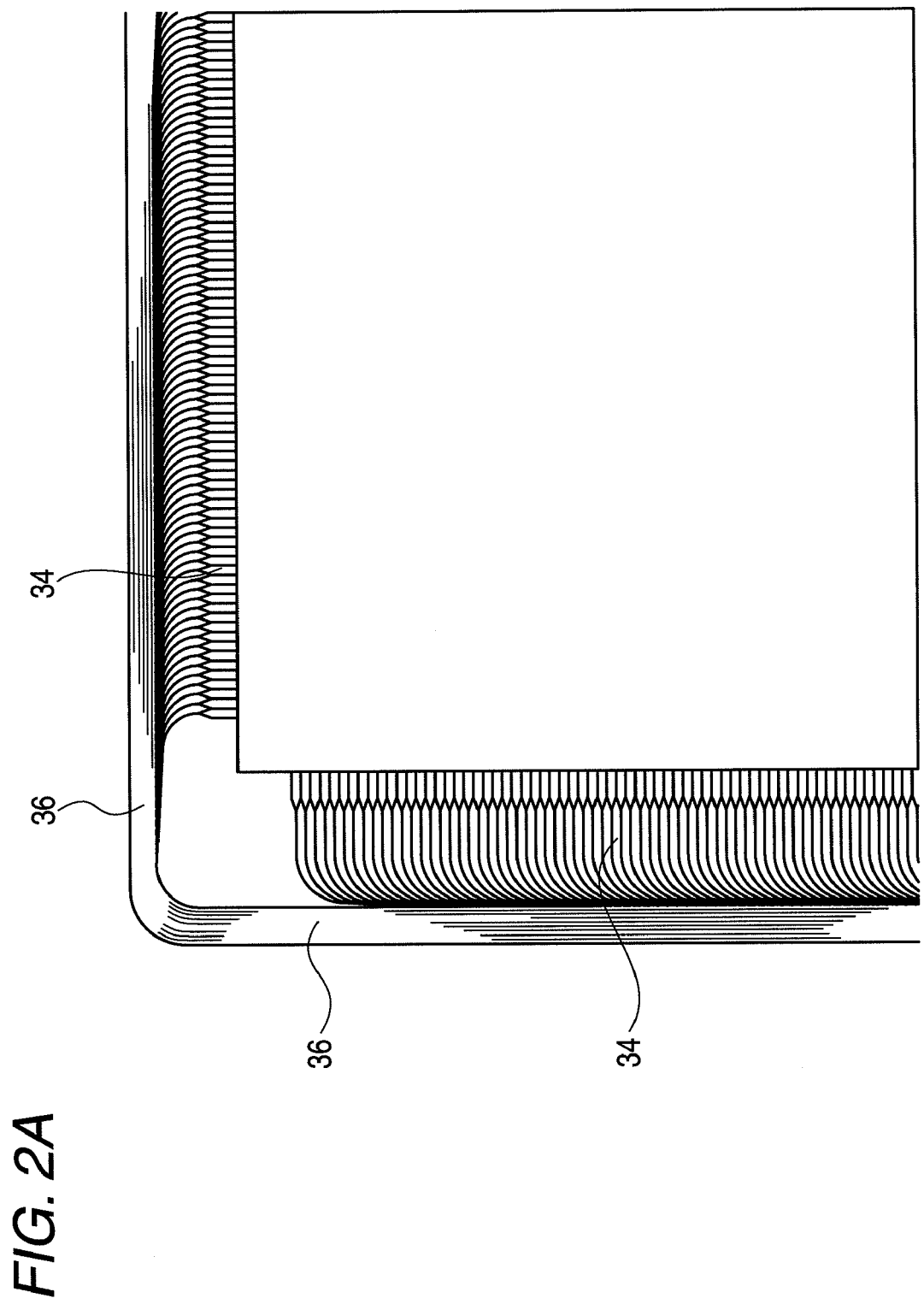
FIGS. 2A to 2D show more detailed views of sections A, B, C, and D, respectively, of the apparatus shown in FIG. 1.
Figure 2B:
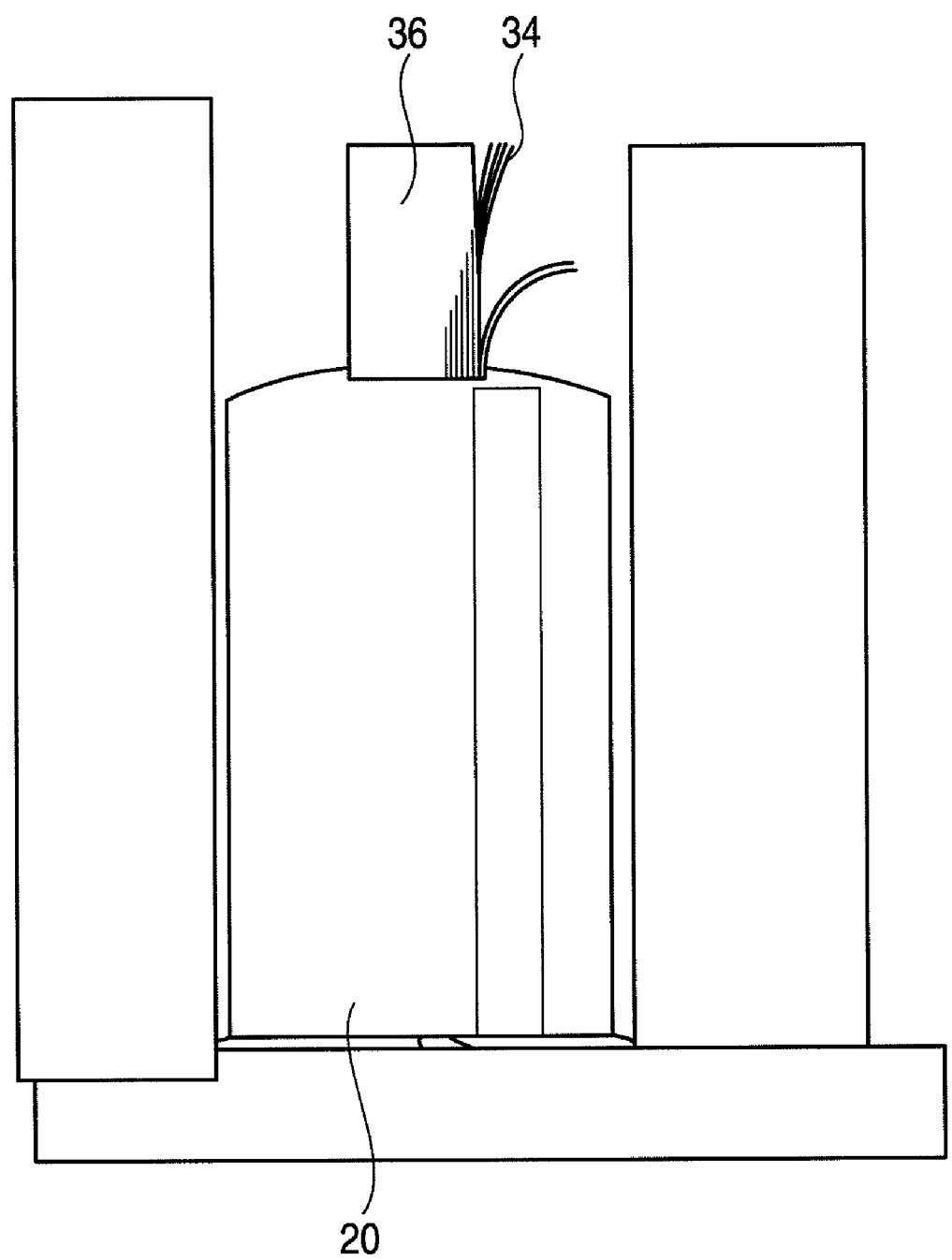
Figure 2C:
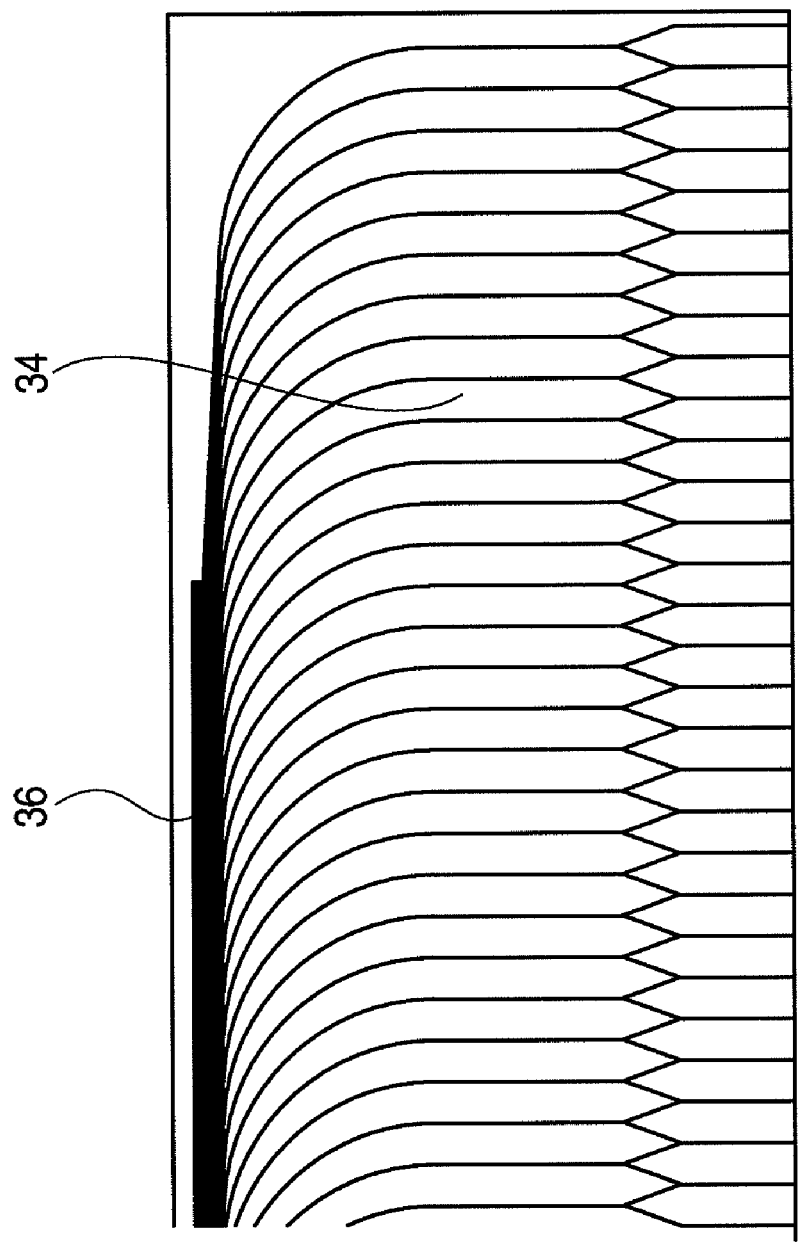
Figure 2D:
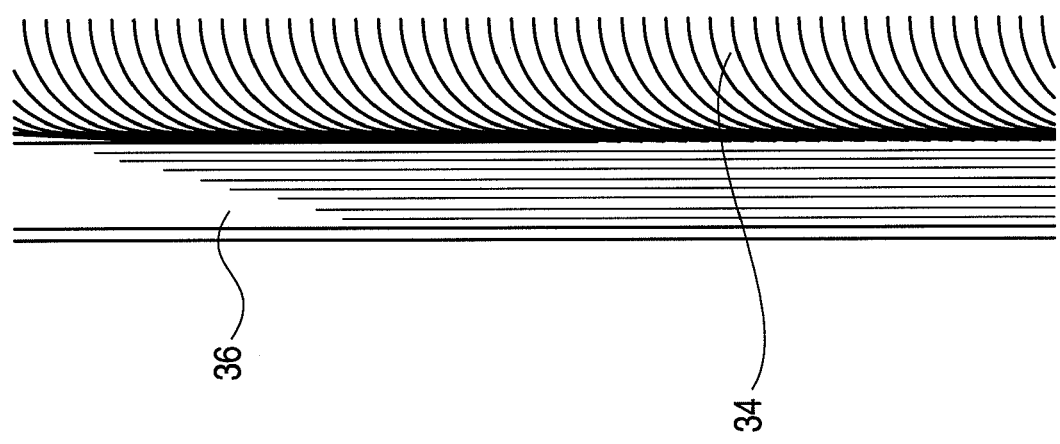

DETAILED DESCRIPTION OF EXEMPLARY
EMBODIMENTS OF THE PRESENT
INVENTION

Exemplary embodiments of the present invention will now be discussed with reference to the accompanying drawings. In the following description, like reference numerals refer to like elements throughout.

Turning now to FIG. 1, a top view of an apparatus is shown. The apparatus 10 comprises a waveguide 30, a reflector 40, a light source 20, and a light detector 15. The light source 20 is optically coupled to one end of the waveguide 30, which extends along two perpendicular sides of a detection space 35. In other words, the waveguide 30 in this exemplary embodiment extends in an "L-shape" around two perpendicular sides of the detection space 35. The reflector 40 extends along two perpendicular sides of the detection space 35 which are located opposite to the sides along which the waveguide 30 is positioned. The reflector 40 may be formed as one integral piece which extends along both of the perpendicular sides of the detection space, or the reflector 40 may be formed as two pieces, one of which extends along a first side of the detection space 35 and another one of which extends long a side perpendicular to the first side. The light detector 15 is also optically coupled to the one end of the waveguide 30.

FIGS. 2A to 2D show more detailed views of the waveguide 30 of FIG. 1. As shown in FIGS. 2A to 2D, the waveguide 30 comprises a wide core section 36 and a plurality of individual waveguide elements 34, each of which produces a single beam of light. The plurality of individual waveguide elements 34 comprise a plurality of transmission waveguide elements (not specifically shown in FIG. 1 or 2A to 2D) and a plurality of reception waveguide elements (not specifically shown in FIG. 1 or 2A to 2D). The plurality of transmission waveguide elements may be formed either on a plane in a single layer or in multiple layers on multiple parallel planes. It should be noted that FIGS. 2A to 2D show the waveguide 30 from the top, and thus only illustrate a single layer of waveguide elements. Providing multiple layers of transmission waveguide elements is advantageous in that it increases the density of the elements and thus increases detection efficiency and sensitivity, resulting in more accurate detection. Similarly, the plurality of reception waveguides may be formed either on a plane in a single layer or in multiple layers on multiple parallel planes. Providing multiple layers of reception waveguide elements is similarly advantageous in that it also increases the density of the elements and thus increases detection efficiency and sensitivity, resulting in more accurate detection. In this exemplary embodiment, the plane (or planes) on which the plurality of transmission waveguide elements is formed is different from the plane (or planes) on which the plurality of reception waveguide elements is formed. Moreover, in this exemplary embodiment, the plurality of transmission waveguide elements are formed on top of the plurality of reception waveguide elements. However, it is also possible to reverse the positions of the transmission and the reception waveguide elements such that the reception waveguide elements are positioned on top of the transmission waveguide elements.

In this exemplary embodiment, the reflector 40 is a mirror having a curved reflection surface. However, the reflector 40 may also be a mirror with a flat surface or a mirror with two 45 degree reflective surfaces, and may be of any geometry which will efficiently reflect light which is incident on the reflector 40. The reflector 40 will be described in more detail below.

In this exemplary embodiment, the light source 20 is a vertical cavity surface emitting laser (VCSEL). However, it is also possible to use other types of light sources such as a laser diode (LD), a light emitting diode (LED), or organic light emitting diode (OLED), etc. The light source 20 may be any light source, which may be optically coupled to the plurality of individual waveguide elements. In this exemplary embodiment, the light detector 15 is an application specific integrated circuit (ASIC). It is also possible to use other types of detectors such as a photodiode, phototransistor, CMOS sensor, and the like. The light detector 15 may be any configuration of sensors, detectors, and processors that may be coupled to the individual waveguide elements to sense and detect light.

The operation of the apparatus 10 will now be described. The light source 20 emits light which is optically coupled into the one end of the waveguide 30. Specifically, light from the light source 20 is optically coupled into the wide core section 36 and then is split into the individual waveguide elements 34 forming the plurality of transmission waveguide elements. (see FIG. 2B) The light is then formed into a plurality of transmission light beams by the waveguide 30 and the transmission light beams are emitted simultaneously across the detection space 35 (i.e., in both a left to right direction and a top to bottom direction in FIG. 1). A first portion of the transmission light beams hits an object (not shown), such as a finger tip, pen, or stylus, located within the detection space 35, and is not reflected by the object. A second portion of the transmission light beams traverses the detection space 35 and is reflected by the reflector 40 back toward the waveguide 30 (i.e., in a right to left direction and a top to bottom direction in FIG. 1). The reflected light beams, i.e., the light beams that are reflected by the reflector 40, are then incident on the individual waveguide elements that form the plurality of reception waveguide elements. The reflected light is received by the reception waveguide elements and is coupled into the light detector 15. The light detector 15 processes the detected light and computes the position of the object within the detection space 35 from the detected light.

In other words, any object (not shown) such as a finger tip, pen, or stylus, which is present in the detection space 35 will block the light beams from the transmission waveguide elements and thus the blocked light beams will not be reflected back to the corresponding reception waveguide elements. Since the individual waveguide elements are addressed by an array of phototransistors which are part of the ASIC, the position of the blocked light beams can be detected. The light detector 15 processes the blocked light beams and computes the position of the object within the detection space 35. The object is detected based on the intensities of the received light. The light reflected back off of the reflector 40 without hitting the object is brighter than the light blocked by the object, since the object blocks the light. Thus, some of the reception waveguide elements will not receive light. This disparity is used to locate the position of the object within the detection space 35.

Referring now to FIGS. 3A to 3I, a more detailed description will now be provided of a waveguide according to an exemplary embodiment of the present invention. A waveguide according to an exemplary embodiment of the present invention includes a substrate 100, a first cladding layer 110, a first core layer 120, a second cladding layer 130, a separation cladding layer 140, a second core layer 150, and a third cladding layer 160.

Figure 3A:
FIGS. 3A to 3I show a structure of a waveguide according to an exemplary embodiment of the present invention.
Figure 3B:
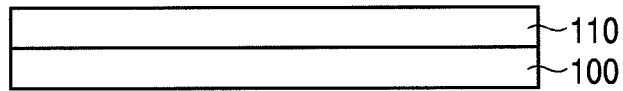

As shown in FIG. 3A, a substrate 100 is provided. The substrate 100 may be Polyethylene Napthalate (PEN) or Polyethylene Terephthalate (PET), Polyimide (PI), Polycarbonate (PC), Polymethylmethacrylate (PMMA), stainless steel (SUS), glass or other such material. A layer of a first photosensitive varnish is then applied to the substrate 100. The first photosensitive varnish is a composition comprising three different epoxies and a photoacid generator having weight ratios of about 35 wt %, about 40 wt %, about 25 wt %, and 0.5 wt %, respectively, and has a refractive index of about 1.542 at 830 nm. The layer of the first photosensitive varnish is irradiated with ultraviolet light and heated to form the first cladding layer 110. In this exemplary embodiment, the first cladding layer 110 has a thickness of about 100 μm. However, the thickness of the first cladding layer 110 may be adjusted according to the parameters of the user input device.

Figure 3C:
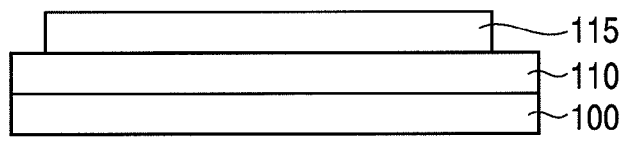

A layer of a second photosensitive varnish is then applied on the first cladding layer 110. The second photosensitive varnish is a composition comprising an epoxy, an oxetane, a solvent, and a photoacid generator having weight ratios of about 70 wt %; about 30 wt %, about 28 wt %, and about 0.5 wt %, respectively, and has a refractive index of about 1.594 at 830 nm. The second photosensitive varnish is then prebaked to remove the solvent content from the second photosensitive varnish. A first photosensitive core layer 115 thus is formed on the first cladding layer 110, as shown in FIG. 3C.

Figure 3D:
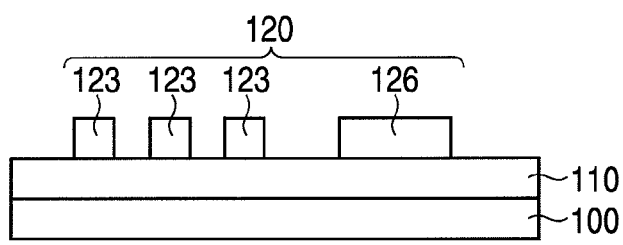

A first photomask is then used to irradiate the photosensitive core layer 115. The first photomask comprises a pattern of linear optical paths having an array of waveguides, a lens structure, and alignment marks. The first photomask is irradiated with ultraviolet light through the first photomask to pattern the photosensitive core layer 115, and post-exposure baking is conducted. The transfer of the pattern of linear optical paths, the lens structure and the alignment marks from the first photomask and the post-exposure baking form the plurality of reception waveguide elements 123 and the lens structure 126 in the first core layer 120. This thus forms a reception waveguide. The photosensitive core layer 115 is then developed by immersing into solvent, washing with fresh solvent, washing with de-ionized water, and drying by mild air blowing. The photosensitive core layer 115 is then heated to remove any residual solvent, and thereby a first core layer 120, comprising the reception waveguide elements 123 and the lens structure 126, is formed, as shown in FIG. 3D, with a thickness of about 24 μm. The alignment marks are not shown in FIG. 3D. Thus, the first core layer 120 is formed which comprises an array of core channels having a straight waveguide, a turning waveguide (for directing the waveguides around the turn in the "L" part of the waveguide) and an end lens, the core channels extending parallel with one another along a lengthwise direction and being spaced apart from one another. In addition, alignment marks are also created, which will be used as described below.

Figure 3E:
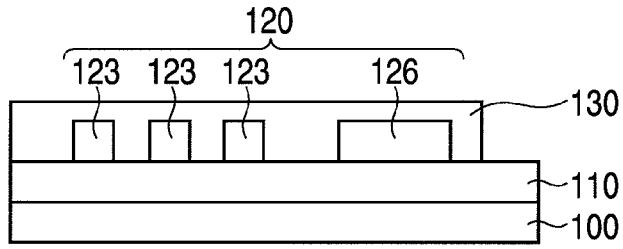

A layer of the first photosensitive varnish is then applied to cover the first core layer 120. The layer of the first photosensitive varnish is then irradiated by ultraviolet light and baked to form the second cladding layer 130, as shown in FIG. 3E. In this exemplary embodiment, the second cladding layer 130 has a thickness of about 75 μm. However, the thickness of the second cladding layer 130 may be adjusted according to the parameters of the user input device.

Figure 3F:
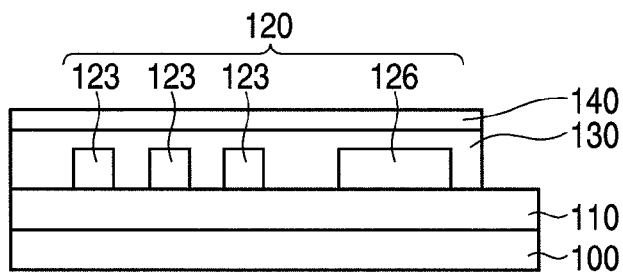

The separation cladding layer 140 is then formed by performing three iterations of the following: applying a layer of the first photosensitive varnish, irradiating the layer with ultraviolet light, and heating the layer. In this way, a separation cladding layer 140 may be formed, as shown in FIG. 3F, having a thickness of about 400 μm. As with the cladding layers described above, the thickness of the separation cladding layer 140 may also be adjusted.

Figure 3G:
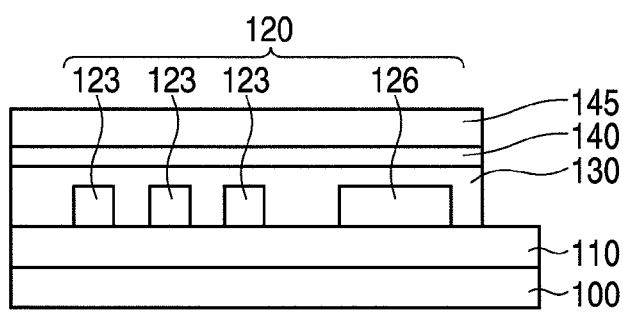

Thereafter, another layer of the second photosensitive varnish is applied on the separation cladding layer 140. The layer of the second photosensitive varnish is then pre-baked to remove the solvent content from layer of the second photosensitive varnish to form a second photosensitive core layer 145, as shown in FIG. 3G.

Figure 3H:
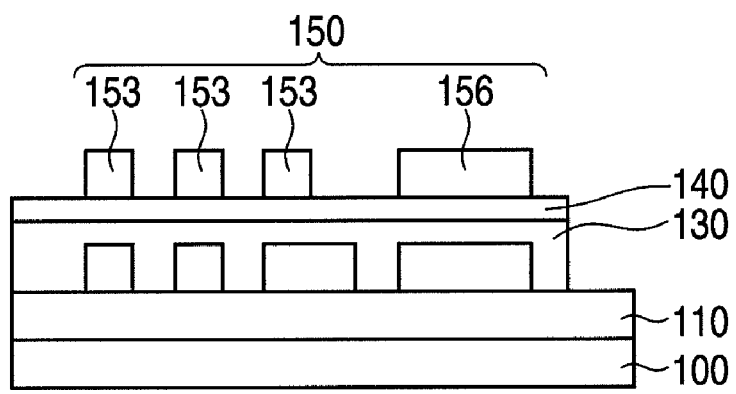

A second photomask is then used to irradiate the second photosensitive core layer 145. The second photomask comprises a pattern of linear optical paths having an array of waveguides, a lens structure, and alignment marks. The alignment marks of the second photomask are aligned with the alignment marks on the first core layer 120. The second photomask is irradiated with ultraviolet light through the second photomask to pattern the second photosensitive core layer 145, and post-exposure baking is conducted. The transfer of the pattern of linear optical paths, the lens structure, and the alignment marks from the second photomask and the post-exposure baking form the plurality of transmission waveguide elements 153 and the lens structure 156 in the second core layer 150. This thus forms a transmission waveguide. The second photosensitive core layer 145 is then developed by immersing into solvent, washing with pure solvent, washing with de-ionized water, and drying by mild air blowing. The second photosensitive core layer 145 is then heated to remove any residual solvent, and thereby the second core layer 150, comprising the transmission waveguide elements 153 and the lens structure 156, is formed, as shown in FIG. 3H. Note that the alignment marks are not shown in FIG. 3H. Thus, the second core layer 150 may be formed with a thickness of about 24 μm in this exemplary embodiment. The thickness of the second core layer 150 may be adjusted according to the parameters of the user input device. The second core layer 150 is formed which comprises an array of core channels having a straight waveguide, a turning waveguide and an end lens, the core channels extending parallel with one another along a lengthwise direction and being spaced apart from one another. Thus, a double layered waveguide structure is formed comprising the substrate 100, the first cladding layer 110, the first core layer 120, the second cladding layer 130, the separation cladding layer 140, and the second core layer 150, as shown in FIG. 3H Since the alignment marks of the second photomask are aligned with the alignment marks on the first core layer 120, the reception waveguide and the transmission waveguide may be precisely aligned, and the plurality of reception waveguide elements may be precisely aligned with the plurality of transmission waveguide elements. Thus, a complex and costly alignment procedure may be avoided.

Figure 3I:
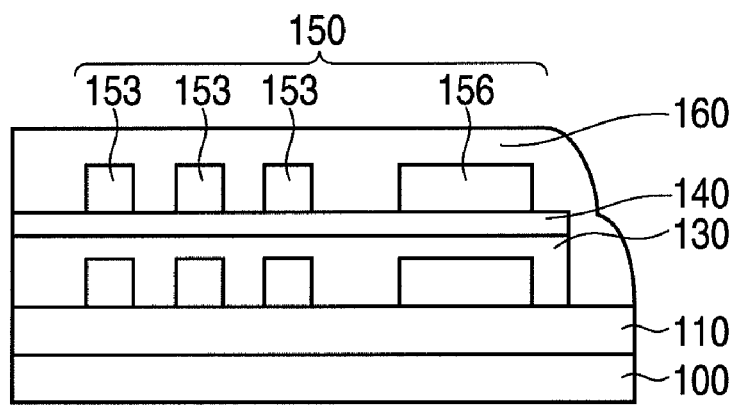

A third cladding layer comprising a vertical lens structure is formed over the double layered waveguide structure as follows. A mold having alignment marks is placed on the double-layered waveguide structure. In this exemplary embodiment, the mold is a quartz mold. However, the mold may be a glass mold, a polymer mold, or any other mold that may efficiently transmit the ultraviolet light in order to cure the coating layer. The first photosensitive varnish is then inserted via an opening of the mold to form a layer over the double layered waveguide structure. The whole structure is then exposed to ultraviolet light, the mold is released, and the whole structure is baked to form the third cladding layer 160, as shown in FIG. 3I. In this exemplary embodiment, the third cladding layer 160 has a thickness of about 700 μm, and the portion 164 of the vertical lens corresponding to the first core layer 120 and the portion 162 of the vertical lens corresponding to the second core layer 150 have radii of curvature of about 1.0 mm and about 1.1 mm, respectively. However, the thickness of the third cladding layer 160 may be adjusted, and the portions 164, 162 of the vertical lens may be adjusted in order to produce different radii of curvature.

Figure 4:
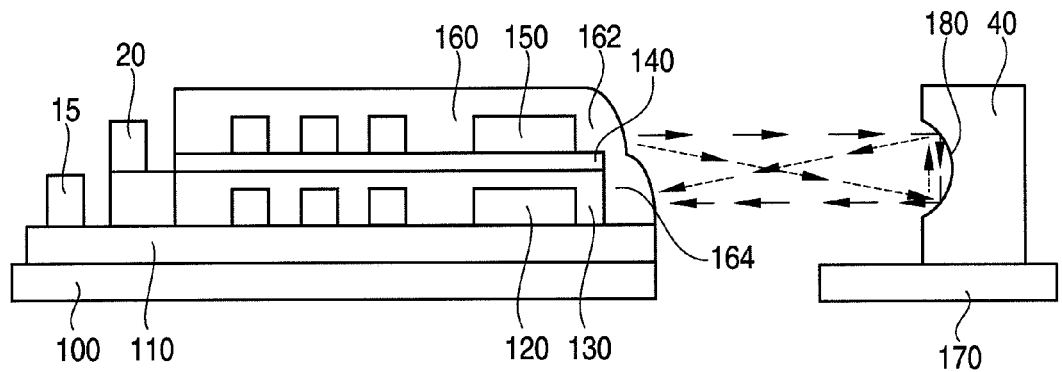
FIG. 4 illustrates a side view of the apparatus of FIG. 1, according to an exemplary embodiment of the present invention.

The waveguide structure is then peeled from the substrate to form a thick film of double layered waveguide structure Turning now to FIG. 4, a side view of the apparatus of FIG. 1 according to an exemplary embodiment is shown. In FIG. 4, it can be more clearly seen that the transmission waveguide and the reception waveguide are stacked. That is, the plurality of transmission waveguide elements of the second core layer 150 are formed on top of the plurality of reception waveguide elements of the first core layer 120. The reflector 40 comprises a front reflection surface 180 formed on a substrate 170. The substrate 170 and the substrate 100 may be the same substrate. The double layered waveguide structure and the reflector structure can be mounted on a rectangular bezel type of this substrate. In this exemplary embodiment, the reflection surface 180 is curved in a concave shape and is coated with a reflective material such as silver.

The light source 20 couples light to the plurality of transmission waveguide elements of the second core layer 150. The individual waveguide elements transmit the light simultaneously through the portion 162 of the vertical lens corresponding to the second core layer 150 and across the detection space (i.e., the arrows pointing from left to right in FIG. 4). This light is reflected by the reflective surface 180 of the reflector 40 and back toward the plurality of reception waveguide elements of the first core layer 120. The light may be reflected both top to bottom and bottom to top by the concave shape of the reflection surface 180. The reflected light is condensed by the portion 164 of the vertical lens corresponding to the first core layer 120 and is thus focused on the plurality of reception waveguide elements of the first core layer 120. The light is finally coupled to the light detector 15 for analysis.

Figure 5:
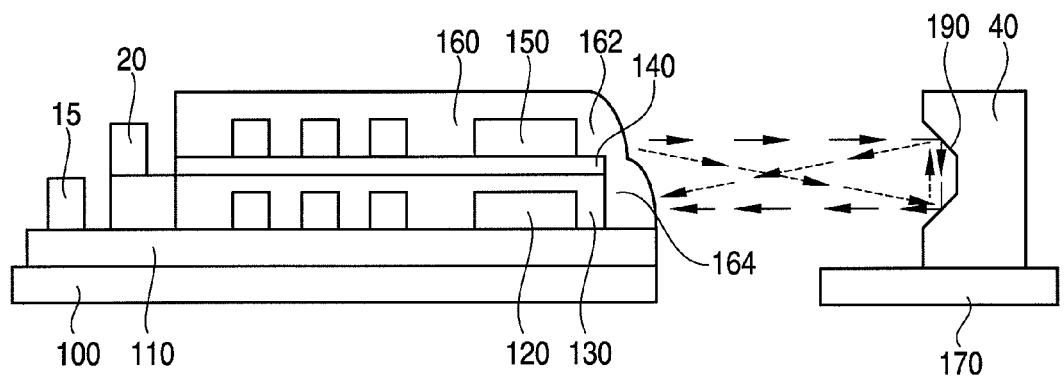
FIG. 5 illustrates a side view of an apparatus according to another exemplary embodiment of the present invention.

Turning now to FIG. 5, a side view of an apparatus according to another exemplary embodiment of the present invention is provided. The apparatus in FIG. 5 is similar to the apparatus in FIG. 4, except for the configuration of the reflector 40, and accordingly, only elements that are different will be described. In this exemplary embodiment, the reflector 40 comprises a substrate 170 and a reflective surface 190. The reflective surface 190 is formed of two sections each formed at about a 45 degree angle. Light is emitted from the plurality of transmission waveguide elements of the second core layer 150 through the portion 162 of the vertical lens corresponding to the second core layer 150 and across the detection space. This transmitted light is then incident on a first part of the reflector surface 190 which is formed at about a 45 degree angle to the incident light. The light is reflected down and is reflected again by a second part of the reflector surface 190 which is also formed at about a 45 degree angle to the incident light. Thus, the light is reflected again off the second part of the reflector surface 190 back towards the waveguide. The light may be reflected both top to bottom and bottom to top by the angled shape of the reflection surface 190. The reflected light is focused by the vertical lens into the plurality of reception waveguide elements that form the first core layer 120.

Figure 6:
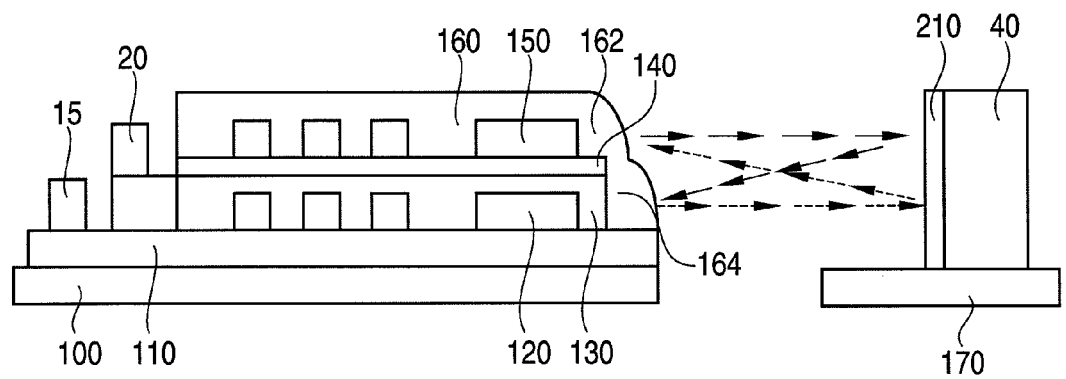
FIG. 6 illustrates a side view of an apparatus according to yet another exemplary embodiment of the present invention.

Referring now to FIG. 6, a side view of an apparatus according to yet another exemplary embodiment of the present invention is shown. The apparatus in FIG. 6 is similar to the apparatus in FIGS. 3 and 4, except for the configuration of the reflector 40, and accordingly only elements that are different will be described here. In this exemplary embodiment, the reflector 40 comprises a substrate 170 and a reflective surface 210. The reflective surface 210 is a flat reflective surface, and is coated with a fluorescent material. Light is emitted from the plurality of transmission waveguide elements of the second core layer 150 through the portion 162 of the vertical lens corresponding to the second core layer 150 and across the detection space. This transmitted light is then incident on the reflective surface 210 and creates a bright spot as a result of the fluorescence from the fluorescent material coating the reflective surface 210. Light emitted from the bright spot is then received and focused by the vertical lens into the plurality of reception waveguide elements that form the first core layer 120, and the imaged by the light detector 15.

In any of the exemplary embodiments discussed above, the substrate 170 and the substrate 100 may be the same substrate. The double layered waveguide structure and the reflector structure may be mounted on a rectangular bezel type of this substrate. Moreover, the substrate 170 may be formed integrally with the substrate 100.

Moreover, although the fluorescent coating is only described above with respect to the exemplary embodiment shown in FIG. 6, the reflective surface of any of the other exemplary embodiments may also be coated with a fluorescent material. The fluorescent material may be different types of dye, for example Nile blue, Coumarin, Fluorescin, or Phthalocyanine, etc. By coating the reflective surface with the fluorescent material, any light beam hitting the reflective surface excites the fluorescent material and thus makes a brighter spot on the reflective surface. The light from this bright spot is then more easily focused and received by the plurality of reception waveguide elements as described above and is sensed and processed. Hence, the fluorescent material increases the sensitivity of the optical touch panel.

Similarly, it is also possible to coat the front surface of the plurality of reception waveguide elements on the waveguide with the fluorescent material. When the returning light beam hits the fluorescent material on the reception waveguide surface, the fluorescent material is excited, resulting in a brighter spot. Hence, the reception waveguide elements are able to more easily sense the returning light, thereby increasing sensitivity.

Figure 7:
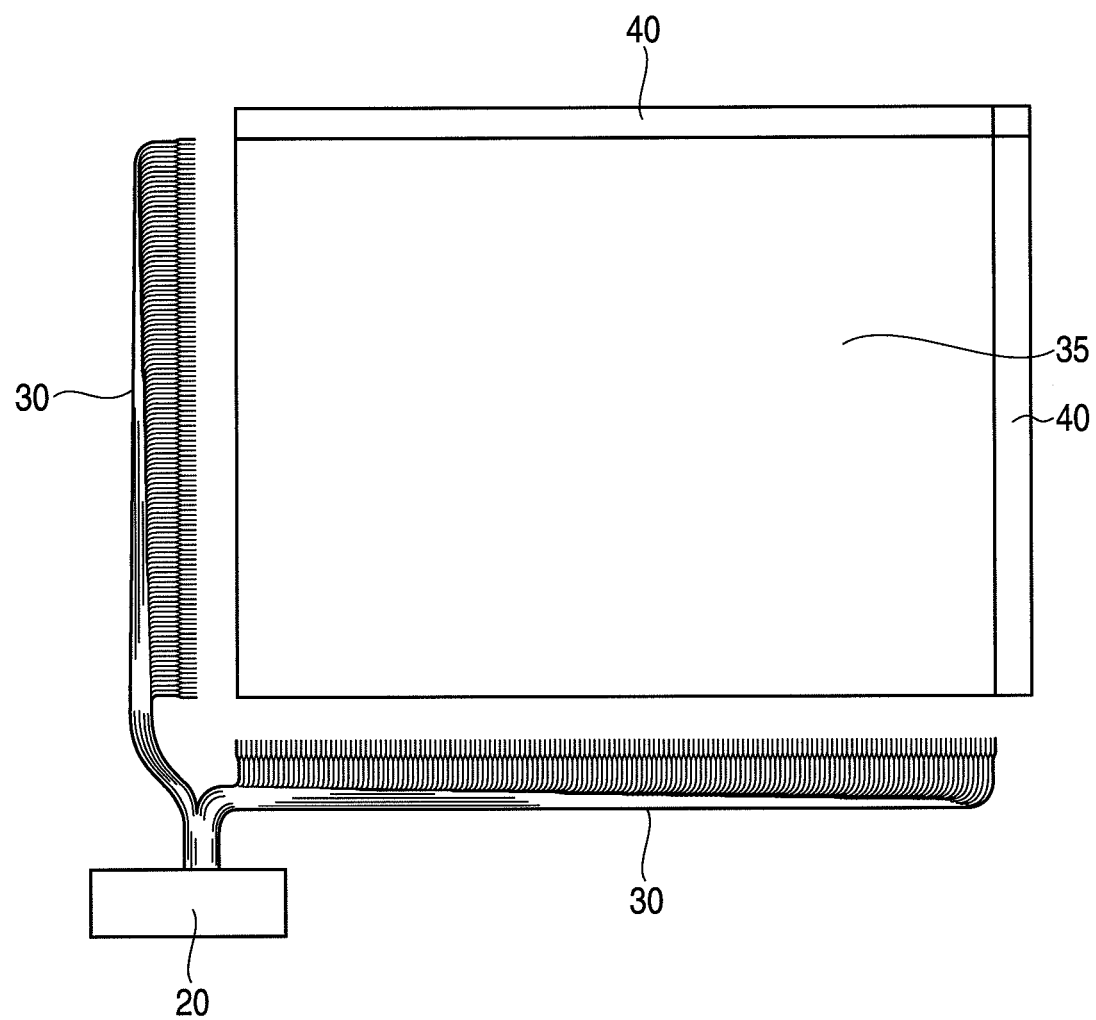
FIG. 7 illustrates a top view of an apparatus according to yet another exemplary embodiment of the present invention.

FIG. 7 illustrates a top view of an apparatus according to yet another exemplary embodiment of the present invention. This exemplary embodiment is similar to the exemplary embodiment in FIG. 1 and discussed above, except for the configuration of the waveguide 30. Accordingly, only elements that are different will be described here. As shown in FIG. 7, the waveguide 30 is provided along two perpendicular sides of the detection space 35. However, in this exemplary embodiment, the light source 20 and the light detector 15 (not shown) are coupled to the waveguide 30 at a corner of the detection space between the two perpendicular sides. In other words, in the exemplary embodiment shown in FIG. 1, the light source 20 and the light detector 15 are provided at the one end of the waveguide 30 and the waveguide 30 forms a continuous L-shape around the two perpendicular sides, whereas in the exemplary embodiment shown in FIG. 7, the waveguide does not form a continuous L-shape, but rather the light source 20 and the light detector 15 are provided at the angle in the "L". By using this configuration, a larger optical touch panel may be formed because the light has less distance to traverse within the waveguide. Accordingly, the loss of intensity of the light along the length of the waveguide is less than in the exemplary embodiment shown in FIG. 1. Moreover, since the waveguide 30 is fabricated using the process described above, a complex and costly alignment procedure is also avoided in this exemplary embodiment.

Figure 8:
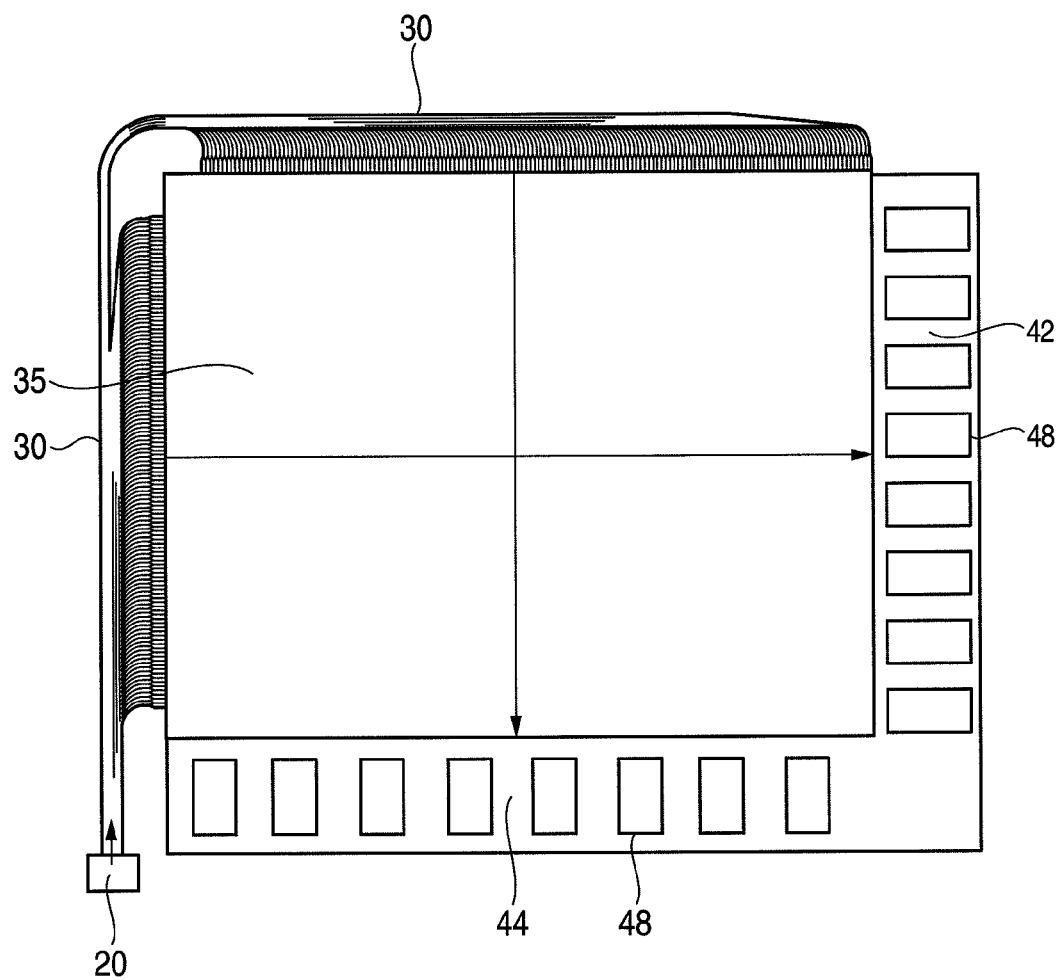
FIG. 8 illustrates a top view of an apparatus according to yet another exemplary embodiment of the present invention.

Turning now to FIG. 8, a top view of an apparatus according to yet another exemplary embodiment of the present invention is provided. This exemplary embodiment is similar to the exemplary embodiment in FIG. 1 discussed above, except for the configuration of the reflector 40. Accordingly, only the elements that are different will be described in detail here. In this exemplary embodiment, no reflector 40 is used. Instead, the reflector 40 is replaced by a first sensor array 42 comprising a plurality of light sensors 48 and a second sensor array 44 comprising a plurality of light sensors 48. The plurality of light sensors 48 of the first sensor array 42 and the second sensor array 44 are coupled to a light detector (not shown). This exemplary embodiment results in a simplified structure, because the waveguide 30 need not be provided with both the plurality of transmission waveguide elements and the plurality of reception waveguide elements. Rather, only the plurality of transmission waveguide elements is provided in the waveguide. Since the light is not reflected in this exemplary embodiment, but rather is sensed directly by the sensors 48, a larger panel may be fabricated while still using the waveguide 30 having the L-shape of the exemplary embodiment shown in FIG. 1.

Experimental Fabrication: Referring to Table 1 below, a detailed description of an experimental fabrication using the fabrication process described above will now be provided.

TABLE 1

| Composition | Varnish A (parts by weight) | Varnish B (parts by weight) |
|---|---|---|
| BPEFG | 35 | 70 |
| TrisP-RK | — | 30 |
| 2021P | 40 | — |
| 2081 | 25 | — |

TABLE 1-continued
| Composition | Varnish A (parts by weight) | Varnish B (parts by weight) |
|---|---|---|
| Ethyl lactate | — | 28 |
| Photoacid Generator (SP-170) | 0.5 | 0.5 |
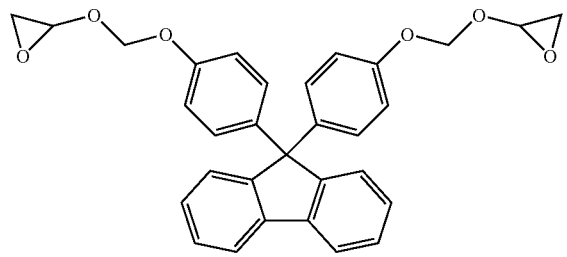
BPEFG
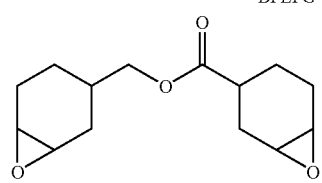
2021P
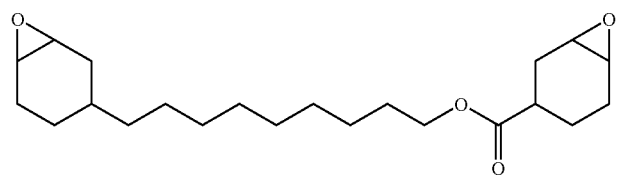
2081
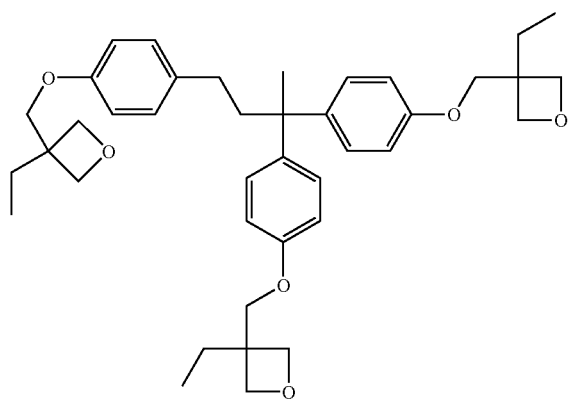
TrisP-RK
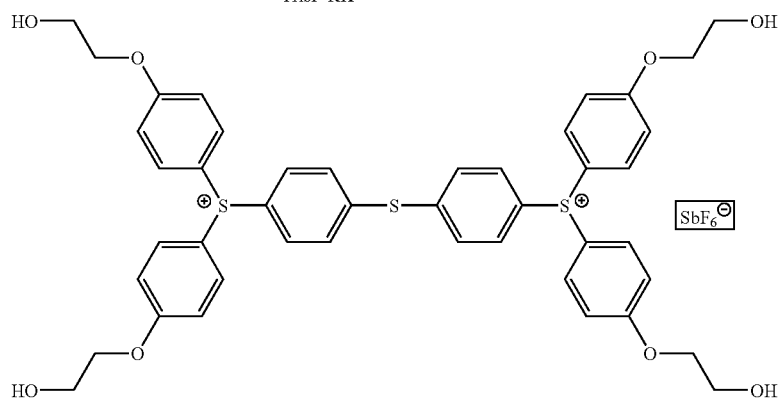
SP170

Preparation of Varnish-A: In a 500 ml reaction vessel, bisphenoxy ethanol fluorene diglycidyl ether (BPEFG) (Osaka Gas Chemicals); 3',4'-Epoxycyclohexyl-carboxylate (2021P) (Daicel Chemicals); and 3',4'-Epoxycyclohexyl-carboxylate (2081) (Daicel Chemicals) were added according to the weight ratio of about 35 wt %; about 40 wt %; and about 25 wt %, respectively. A photoacid generator named SP-170 (Asahi Denka) was added with a weight ratio of about 0.5 wt %. The reaction vessel was then put into an oil bath at a temperature of about 90° C. and an electric stirrer stirred the mixture at 300 rpm for about 60 minutes. Then the mixture was cooled and filtered to remove any undissolved materials. Finally the varnish was stored in a dark bottle.

Preparation of Varnish-B: In a similar 500 ml reaction vessel, bisphenoxy ethanol fluorene diglycidyl ether (BPEFG); 1,3,3-Tris(4-(2-(3-oxetanyl)butoxy phenyl) butane (TrisP-RK); ethyl lactate, and the photoacid generator named SP-170 (Asahi Denka) were taken according to the weight ratio of about 70 wt %; about 30 wt %; about 28 wt %; and about 0.5 wt %, respectively. The TrisP-RK was produced using the method described in Japanese Patent Application Publication No. 2007-070320, which is herein incorporated by reference in its entirety. The reaction vessel was then put into an oil bath at a temperature of about 80° C. and an electric stirrer stirred the mixture at 250 rpm for about 3 hours. Then the mixture was cooled and filtered to remove any undissolved materials. Finally the varnish was stored in a dark bottle.

A first photosensitive varnish comprising the Varnish-A was applied on a polyethylenenaphthalate (PEN) substrate. The varnish layer was irradiated with ultraviolet light in an exposure dose of about 2000 mJ/cm$^2$ using a 365 nm bandpass filter. Thereafter, the resin layer was heated at about 120° C. for about 15 minutes to thereby form a first cladding layer 110 having a thickness of about 100 µm.

A second photosensitive varnish comprising the Varnish-B was then applied on first cladding layer 110. The resin layer was subjected to a pre-bake at about 100° C. for about 5 minutes in order to remove the solvent content in the varnish. A first photosensitive core layer 115 was thus formed on the first cladding layer 110.

A first photomask in which a pattern of linear optical paths having an array of waveguide core with a line and space of about 12 µm and about 12 µm, respectively, and a lens structure, was used to irradiate the photosensitive resin by a close proximity exposure method in an exposure dose of about 2500 mJ/cm$^2$. The first photomask also comprised alignment marks. A band pass filter with center wavelength of about 365 nm was used to irradiate ultraviolet light through the first photomask. After the photo patterning by ultraviolet light, the photosensitive resin was subjected to post-exposure baking at about 80° C. for about 15 minutes in order to cure the first photosensitive core layer 115.

The resin layer was then developed by immersing into y-butyrolactone solvent for about 2 minutes followed by washing with fresh y-butyrolactone solvent, washing with de-ionized water, and finally drying by mild air blowing. The resin layer was then heated at about 120° C. for about 15 minutes in order to remove the residual solvent of the photosensitive resin and thereby form a first core layer 120 having thickness of about 24 µm. Thus an array of core channels having straight waveguide, turning waveguide, and an end lens were formed which extend parallel with one another along the lengthwise direction and were apart from one another. In addition, the alignment marks also created, which will be used to pattern the upper core layer.

Thereafter, the first photosensitive varnish was applied so as to cover the first core layer 120. The whole photosensitive layer was then irradiated by ultraviolet light in an exposure dose of about 2000 mJ/cm$^2$ using a 365 nm bandpass filter followed by a post exposure baking at about 120° C. for about 15 minutes. In this way a second cladding layer 130, as shown in FIG. 3E, was formed having a thickness of about 75 µm.

The first photosensitive varnish was again applied on the resin layer three (3) times. The varnish layer was irradiated each time with ultraviolet light in an exposure dose of about 2000 mJ/cm$^2$ using a 365 nm bandpass filter. Thereafter, the resin layer was heated each time at about 120° C. for about 15 minutes to thereby form a separation cladding layer 140 having a total thickness of about 400 µm.

Thereafter, a second photosensitive varnish was then applied on the separation cladding layer 140. The resin layer was subjected to a pre-bake at about 100° C. for about 5 minutes in order to remove the solvent content in the varnish. A second photosensitive core layer 145 was thus formed on the separation cladding layer 140.

A second photomask in which a pattern of linear optical paths having an array of waveguide core with a line and space of about 12 µm and about 12 µm, respectively, and a lens structure, was used to irradiate the photosensitive resin by a close proximity exposure method in an exposure dose of about 2500 mJ/cm$^2$. The second photosensitive mask was precisely aligned with the alignment marks on the first core layer 120. The second photomask also comprised alignment marks. A band pass filter with center wavelength of 365 nm was used to irradiate ultraviolet light through the second photomask. After the photo patterning by ultraviolet light, the photosensitive resin was subjected to post-exposure baking at about 80° C. for about 15 minutes in order to cure the second photosensitive core layer 145.

The resin layer was then developed by immersing into y-butyrolactone solvent for about 2 minutes followed by washing with fresh y-butyrolactone solvent, washing with de-ionized water, and finally drying by mild air blowing. The resin layer was then heated at about 120° C. for about 15 minutes in order to remove the residual solvent of the photosensitive resin and thereby form a second core layer 150 having thickness of about 24 µm. Thus an array of core channels having straight waveguide, turning waveguide, and an end lens were formed which extend parallel with one another along the lengthwise direction and were apart from one another. In addition, the alignment marks were also created.

Therefore, a double layer core structure was formed, with each layer being spaced apart by about 400 um and collocated with respect to each other.

Thereafter, a third cladding layer 160 comprising a vertical lens was fabricated on the double layer waveguide structure. A quartz mold having specific alignment marks was placed on the double-layered waveguide structure, and aligned with the alignment marks of the first core layer 120 and the second core layer 150. The first photosensitive varnish was then inserted via an opening in the quartz mold. The whole structure was then exposed to ultraviolet light via a third photomask with an exposure dose of about 2500 mJ/cm$^2$. After the exposure, the quartz mold was released and the resin layer was baked at about 80° C. for about 15 minutes.

The waveguide structure was then developed and baked at about 120° C. for about 15 minutes. In this way, the third cladding layer 160 as well as a vertical lens was fabricated having a thickness of about 700 um. The vertical lens comprised both a portion 162 corresponding to the second core layer 150 and a portion 164 corresponding to the first core layer 120, having a radius of curvature of about 1.0 mm and about 1.1 mm, respectively.

Finally, the waveguide structure was peeled from the substrate and thus a thick film of double layered waveguide structure was created.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus comprising:
a waveguide comprising a plurality of transmission waveguide elements and a plurality of reception waveguide elements;
a light source coupled to the waveguide;
a light detector coupled to the waveguide; and
a reflector, spaced apart from the waveguide, the reflector reflecting light emitted from the plurality of transmission waveguide elements towards the reception waveguide elements,
wherein a reflecting surface of the reflector is coated with a fluorescent material.

2. The apparatus of claim 1, wherein the plurality of transmission waveguide elements are formed on a first plane within the waveguide and the plurality of reception waveguide elements are formed on a second plane within the waveguide, and the first plane is different from the second plane.

3. The apparatus of claim 2, wherein the plurality of transmission waveguide elements are formed on top of the plurality of reception waveguide elements within the waveguide.

4. The apparatus of claim 1, wherein the plurality of transmission waveguide elements are formed on top of the plurality of reception waveguide elements within the waveguide.

5. The apparatus of claim 4, wherein the plurality of transmission waveguide elements are separated from the plurality of reception waveguide elements by a cladding layer.

6. The apparatus of claim 1, further comprising a lens for focusing the light emitted from the plurality of transmission waveguides.

7. The apparatus of claim 1, further comprising a lens for focusing the light which is reflected towards the plurality of reception waveguide elements.

8. The apparatus of claim 1, further comprising a lens comprising a first lens portion and a second lens portion, wherein the first lens portion focuses light emitted from the plurality of transmission elements and the second lens portion focuses light which is reflected towards the plurality of reception waveguide elements.

9. The apparatus of claim 8, wherein the lens is integrally formed with the plurality of transmission waveguide elements and the plurality of reception waveguide elements.

10. The apparatus of claim 1, wherein the waveguide is formed on perpendicular sides of a detection area, and the reflector is formed on sides of the detection area opposite to the waveguide.

11. The apparatus of claim 1, wherein the waveguide comprises two waveguide sections, each of the two waveguide sections comprising the plurality of transmission waveguide elements and the plurality of reception waveguide elements, the reflector comprises two reflector sections, and
the two waveguide sections are provided on perpendicular sides of the detection area, and the two reflector sections are provided on sides of the detection area opposite to the two waveguide sections, respectively, such that light emitted by the plurality of transmission waveguide elements of one of the waveguide sections is reflected by the reflector section opposite to the one of the waveguide sections back toward the plurality of reception waveguide elements of the one waveguide section, and
light emitted by the plurality of transmission waveguide elements of the other of the waveguide sections is reflected by the reflector section opposite to the other of the waveguide sections back toward the plurality of reception waveguide elements of the other of the waveguide sections.

12. The apparatus of claim 11, wherein the light source is optically coupled to the plurality of transmission waveguide elements of the two waveguide sections, and the light detector is optically coupled to the plurality of reception waveguide elements of the two waveguide sections.

13. The apparatus of claim 1, wherein a reflecting surface of the reflector is curved.

14. The apparatus of claim 1, wherein the reflector comprises at least two reflective surfaces arranged at a 45 degree angle with respect a front surface of the reflector.

15. An apparatus comprising:
a waveguide comprising a plurality of transmission waveguide elements and a plurality of reception waveguide elements;
a light source coupled to the waveguide;
a light detector coupled to the waveguide; and
a reflector, spaced apart from the waveguide, the reflector reflecting light emitted from the plurality of transmission waveguide elements towards the reception waveguide elements,
wherein a front surface of the plurality of reception elements is coated with a fluorescent material.

16. An optical touch panel comprising:
a waveguide section comprising:
a substrate;
a first cladding layer formed on the substrate;
a reception waveguide, formed on the first cladding layer, the reception waveguide comprising a plurality of reception waveguide elements;
a second cladding layer formed on the reception waveguide;
a transmission waveguide, formed on the second cladding layer, the transmission waveguide comprising a plurality of transmission waveguide elements; and
a third cladding layer, formed on the transmission waveguide, the third cladding layer comprising a reception lens portion and a transmission lens portion, the reception lens portion formed in a position corresponding to the reception waveguide and the transmission lens portion formed in a position corresponding to the position of the transmission waveguide;
a mirror provided on an opposite side of a detection area from the waveguide section;
a surface emitting laser optically coupled to the waveguide section; and
a detector optically coupled to the waveguide section.,
wherein a reflecting surface of the mirror is coated with a fluorescent material.

17. The optical touch panel of claim 16, wherein the waveguide section is formed on perpendicular sides of a detection area, and the mirror is formed on sides of the detection area opposite to the waveguide section.

18. The optical touch panel of claim 16, wherein the waveguide section is a first waveguide section and the mirror is a first mirror, and the optical touch panel further comprises a second mirror and a second waveguide section, the second waveguide section comprising:
   a substrate;
   a first cladding layer formed on the substrate;
   a reception waveguide, formed on the first cladding layer, the reception waveguide comprising a plurality of reception waveguide elements;
   a second cladding layer formed on the reception waveguide;
   a transmission waveguide, formed on the second cladding layer, the transmission waveguide comprising a plurality of transmission waveguide elements; and
   a third cladding layer, formed on the transmission waveguide, the third cladding layer comprising a reception lens portion and a transmission lens portion, the reception lens portion formed in a position corresponding to the reception waveguide and the transmission lens portion formed in a position corresponding to the position of the transmission waveguide; and
   wherein the first waveguide section and the second waveguide section are provided on perpendicular sides of the detection area and the first mirror and the second mirror are provided on sides of the detection area opposite to the first waveguide section and the second waveguide section, respectively, and
the surface emitting laser is optically coupled to the plurality of transmission waveguide elements of the first waveguide section and the plurality of transmission waveguide elements of the second waveguide section, and the detector is optically coupled to the plurality of reception waveguide elements of the first waveguide section and the plurality of reception waveguide elements of the second waveguide section.

19. An optical touch panel comprising:
a waveguide section comprising:
   a substrate;
   a first cladding layer formed on the substrate;
   a reception waveguide, formed on the first cladding layer, the reception waveguide comprising a plurality of reception waveguide elements;
   a second cladding layer formed on the reception waveguide;
   a transmission waveguide, formed on the second cladding layer, the transmission waveguide comprising a plurality of transmission waveguide elements; and
   a third cladding layer, formed on the transmission waveguide, the third cladding layer comprising a reception lens portion and a transmission lens portion, the reception lens portion formed in a position corresponding to the reception waveguide and the transmission lens portion formed in a position corresponding to the position of the transmission waveguide;
a mirror provided on an opposite side of a detection area from the waveguide section;
a surface emitting laser optically coupled to the waveguide section; and
a detector optically coupled to the waveguide section,
wherein a front surface of the plurality of reception elements of the waveguide section is coated with a fluorescent material.

20. An optical touch panel comprising:
a waveguide section comprising:
   a substrate;
   a first cladding layer formed on the substrate;
   a reception waveguide, formed on the first cladding layer, the reception waveguide comprising a plurality of reception waveguide elements;
   a second cladding layer formed on the reception waveguide;
   a transmission waveguide, formed on the second cladding layer, the transmission waveguide comprising a plurality of transmission waveguide elements; and
   a third cladding layer, formed on the transmission waveguide, the third cladding layer comprising a reception lens portion and a transmission lens portion, the reception lens portion formed in a position corresponding to the reception waveguide and the transmission lens portion formed in a position corresponding to the position of the transmission waveguide;
a mirror provided on an opposite side of a detection area from the waveguide section;
a surface emitting laser optically coupled to the waveguide section; and
a detector optically coupled to the waveguide section;
wherein the waveguide section is a first waveguide section and the mirror is a first mirror, and the optical touch panel further comprises a second mirror and a second waveguide section, the second waveguide section comprising:
a substrate;
   a first cladding layer formed on the substrate;
   a reception waveguide, formed on the first cladding layer, the reception waveguide comprising a plurality of reception waveguide elements;
   a second cladding layer formed on the reception waveguide;
   a transmission waveguide, formed on the second cladding layer, the transmission waveguide comprising a plurality of transmission waveguide elements; and
   a third cladding layer, formed on the transmission waveguide, the third cladding layer comprising a reception lens portion and a transmission lens portion, the reception lens portion formed in a position corresponding to the reception waveguide and the trans- mission lens portion formed in a position corresponding to the position of the transmission waveguide;
wherein the first waveguide section and the second waveguide section are provided on perpendicular sides of the detection area and the first mirror and the second mirror are provided on sides of the detection area opposite to the first waveguide section and the second waveguide section, respectively, and
the surface emitting laser is optically coupled to the plurality of transmission waveguide elements of the first waveguide section and the plurality of transmission waveguide elements of the second waveguide section, and the detector is optically coupled to the plurality of reception waveguide elements of the first waveguide section and the plurality of reception waveguide elements of the second waveguide section; and
wherein a reflecting surface of the first mirror and a reflecting surface of the second mirror are coated with a fluorescent material.

21. An optical touch panel comprising:
a waveguide section comprising:
   a substrate;
   a first cladding layer formed on the substrate;
   a reception waveguide, formed on the first cladding layer, the reception waveguide comprising a plurality of reception waveguide elements;
   a second cladding layer formed on the reception waveguide;

a transmission waveguide, formed on the second cladding layer, the transmission waveguide comprising a plurality of transmission waveguide elements; and
a third cladding layer, formed on the transmission waveguide, the third cladding layer comprising a reception lens portion and a transmission lens portion, the reception lens portion formed in a position corresponding to the reception waveguide and the transmission lens portion formed in a position corresponding to the position of the transmission waveguide;
a mirror provided on an opposite side of a detection area from the waveguide section;
a surface emitting laser optically coupled to the waveguide section; and
a detector optically coupled to the waveguide section;
wherein the waveguide section is a first waveguide section and the mirror is a first mirror, and the optical touch panel further comprises a second mirror and a second waveguide section, the second waveguide section comprising:
a substrate;
a first cladding layer formed on the substrate;
a reception waveguide, formed on the first cladding layer, the reception waveguide comprising a plurality of reception waveguide elements;
a second cladding layer formed on the reception waveguide;
a transmission waveguide, formed on the second cladding layer, the transmission waveguide comprising a plurality of transmission waveguide elements; and
a third cladding layer, formed on the transmission waveguide, the third cladding layer comprising a reception lens portion and a transmission lens portion, the reception lens portion formed in a position corresponding to the reception waveguide and the transmission lens portion formed in a position corresponding to the position of the transmission waveguide;
wherein the first waveguide section and the second waveguide section are provided on perpendicular sides of the detection area and the first mirror and the second mirror are provided on sides of the detection area opposite to the first waveguide section and the second waveguide section, respectively, and
the surface emitting laser is optically coupled to the plurality of transmission waveguide elements of the first waveguide section and the plurality of transmission waveguide elements of the second waveguide section, and the detector is optically coupled to the plurality of reception waveguide elements of the first waveguide section and the plurality of reception waveguide elements of the second waveguide section; and
wherein a front surface of the plurality of reception elements of the first waveguide section and a front surface of the plurality of reception elements of the second waveguide section are coated with a fluorescent material.

* * * * *